(12) United States Patent
Hickerson

(10) Patent No.: US 8,988,492 B2
(45) Date of Patent: Mar. 24, 2015

(54) METHOD AND APPARATUS FOR CORRECTION OF AN IMAGE FROM A FISHEYE LENS IN A CAMERA

(75) Inventor: Dallas Dwight Hickerson, Sharpsburg, GA (US)

(73) Assignee: Panasonic Automotive Systems Company of America, division of Panasonic Corporation of North America, Peachtree City, GA (US)

( * ) Notice: Subject to any disclaimer, the term of this patent is extended or adjusted under 35 U.S.C. 154(b) by 1177 days.

(21) Appl. No.: 12/322,246

(22) Filed: Jan. 30, 2009

(65) Prior Publication Data

US 2010/0194850 A1   Aug. 5, 2010

(51) Int. Cl.
- H04N 7/00 (2011.01)
- H04N 7/18 (2006.01)
- H04N 5/225 (2006.01)
- G06T 3/00 (2006.01)

(52) U.S. Cl.
CPC ................................. *G06T 3/0018* (2013.01)
USPC .............................. 348/36; 348/148; 348/340

(58) Field of Classification Search
USPC ........................................... 348/36, 148, 340
See application file for complete search history.

(56) References Cited

U.S. PATENT DOCUMENTS

| | | | |
|---|---|---|---|
| 5,471,350 A | 11/1995 | Lokhoff | |
| 5,691,765 A * | 11/1997 | Schieltz et al. | 348/335 |
| 5,870,135 A * | 2/1999 | Glatt et al. | 348/39 |
| 6,577,335 B2 * | 6/2003 | Kobayashi et al. | 348/152 |
| 6,833,843 B2 * | 12/2004 | Mojaver et al. | 345/647 |
| 7,202,888 B2 * | 4/2007 | Tecu et al. | 348/208.11 |
| 2004/0028292 A1 | 2/2004 | Alm et al. | |
| 2004/0030527 A1 * | 2/2004 | Rankin | 702/153 |
| 2006/0044435 A1 | 3/2006 | Suska | |
| 2006/0072212 A1 * | 4/2006 | Nanba et al. | 359/689 |
| 2007/0182812 A1 * | 8/2007 | Ritchey | 348/36 |
| 2008/0101713 A1 | 5/2008 | Edgar | |
| 2008/0136943 A1 | 6/2008 | Azuma | |
| 2011/0181689 A1 * | 7/2011 | Kweon | 348/37 |

FOREIGN PATENT DOCUMENTS

| | | |
|---|---|---|
| JP | 04-042679 H | 2/1992 |
| JP | 2002-127852 | 5/2002 |

* cited by examiner

*Primary Examiner* — Minh-Chau Nguyen
(74) *Attorney, Agent, or Firm* — Laurence S. Roach, Esq.

(57) ABSTRACT

A method of operating a video system includes receiving an image captured by use of a fisheye lens. The image is divided into a plurality of horizontal image lines. A respective fraction of each of the horizontal image lines is sampled with a different respective sampling frequency. Each sampling frequency is inversely related to a size of the sampled fraction. The size of the sampled fraction increases with each horizontal image line in a progression from a top of the image to a bottom of the image.

20 Claims, 6 Drawing Sheets

METHOD AND APPARATUS FOR CORRECTION OF AN IMAGE FROM A FISHEYE LENS IN A CAMERA

BACKGROUND OF THE INVENTION

1. Field of the Invention

The present invention relates to apparatus and methods for operating a camera system including a fisheye lens, and, more particularly, to apparatus and methods for operating an automotive rear view camera system including a fisheye lens.

2. Description of the Related Art

Automotive rear view cameras often use optical fisheye lens. A fisheye lens is a type of wide-angle lens that produces a very wide, hemispherical image. Like all the ultra-wide angle lenses, fisheye lenses suffer from barrel distortion, especially for extremely wide angles of view, which results in a convex appearance.

An example of a distorted image captured via an automotive rear view camera is shown in FIG. 1. As is typical of the distortion produced by a fisheye lens, the field of view is much wider, e.g., about three times wider, at the top of the image than at the bottom of the image. The reason for this disparity may be that objects at the top of the image are farther away from the lens than are objects at the bottom of the image.

It may be possible to remove the distortion caused by the fisheye lens by using a video Digital Signal Processor (DSP) with SDRAM. However, such employment of a full-blown DSP would be an expensive solution and thus may be considered overkill.

Accordingly, what is neither anticipated nor obvious in view of the prior art is a method of giving the viewer the option of removing distortion from images captured by use of a fisheye lens, and doing so in an inexpensive way.

SUMMARY OF THE INVENTION

The present invention provides a method for the correction of fisheye distortion by "stretching out" a mid-portion of the top of the image proportionally to the amount of distortion. The degree of "stretching out", or the width of the periphery of the image that is eliminated during the stretching, may steadily decrease from the top of the image to the bottom of the image until the entire captured image is included at the bottom of the image.

In one embodiment, a video First-In, First-Out (FIFO) Memory is used to remove the distortion caused by the fisheye lens by modulating the FIFO memory's clock proportionally to the degree of distortion.

The invention comprises, in one form thereof, a method of operating a video system including receiving an image captured by use of a fisheye lens. The image is divided into a plurality of horizontal image lines. A respective fraction of each of the horizontal image lines is sampled with a different respective sampling frequency. Each sampling frequency is inversely related to a size of the sampled fraction. The size of the sampled fraction increases with each horizontal image line in a progression from a top of the image to a bottom of the image. The size of the sampled fraction (and therefore the sampling frequency) may be a function of the lens' characteristics, such as the distortion characteristics.

The invention comprises, in another form thereof, a method of operating a video system including receiving a first analog image captured by use of a fisheye lens. The analog image is converted into digital image data. The image data is divided into a plurality of image lines. A respective middle portion of each of the image lines is sampled with a different respective sampling frequency. Each sampling frequency is inversely related to a fraction of the respective image line occupied by the middle portion. The fraction of the image line occupied by the middle portion increasing with each image line in a progression from a first edge of the image to a second edge of the image. The sampled digital image lines are converted into a second analog image.

The invention comprises, in yet another form thereof, a method of operating a video system including receiving a first image captured by use of a fisheye lens. The image is divided into a plurality of horizontal image lines. Each image line has a middle portion and two lateral portions. A size of the middle portion relative to the lateral portions increases with each horizontal image line from a top of the image to a bottom of the image. The lateral portions of the image lines are discarded. Each of the middle portions is represented by a substantially equal number of samples. A second image including the samples is formed.

An advantage of the present invention is that the image distortion generated by a fisheye lens may be corrected inexpensively.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

In one embodiment, the method of the present invention includes clock modulation, i.e., modulation of the frequency at which the image is sampled for reproduction on a screen or monitor. In one particular embodiment, the captured image is reproduced on the screen via National Television System Committee (NTSC) analog television system video with a horizontal line frequency (Fh)=15,734.266 Hz, sampled at 13.5 MHz. At this rate, there would be 858 (i.e., 13.5 MHz/15,734.266 Hz) samples across the entire line of the video screen, including the Horizontal Blanking Interval. Within the active line, i.e., the visible portion of the video line, there may be 720 of the 858 samples. If the clock rate is increased, more samples may be captured per line, or, more importantly, the 720 samples may be captured within a smaller portion of a given line.

For example, consider an initial maximum clock rate of approximately 40 MHz applied to the top line of a given video image. At this rate, there would be 2,542 (i.e., 40 MHz/15, 734.266 Hz) samples across the entire top line of the video screen, including the Horizontal Blanking Interval. Within the active line, i.e., the visible portion of the video line, there may be 2,133 of the 2,542 samples. According to one embodiment of the invention, 720 samples, i.e., approximately one-third of the 2,133 sample video line, may be captured in the First-In, First-Out (FIFO) memory from a middle portion, e.g., the middle third, of the top video line, as illustrated in FIG. 2a.

Figures 2A, 2B:
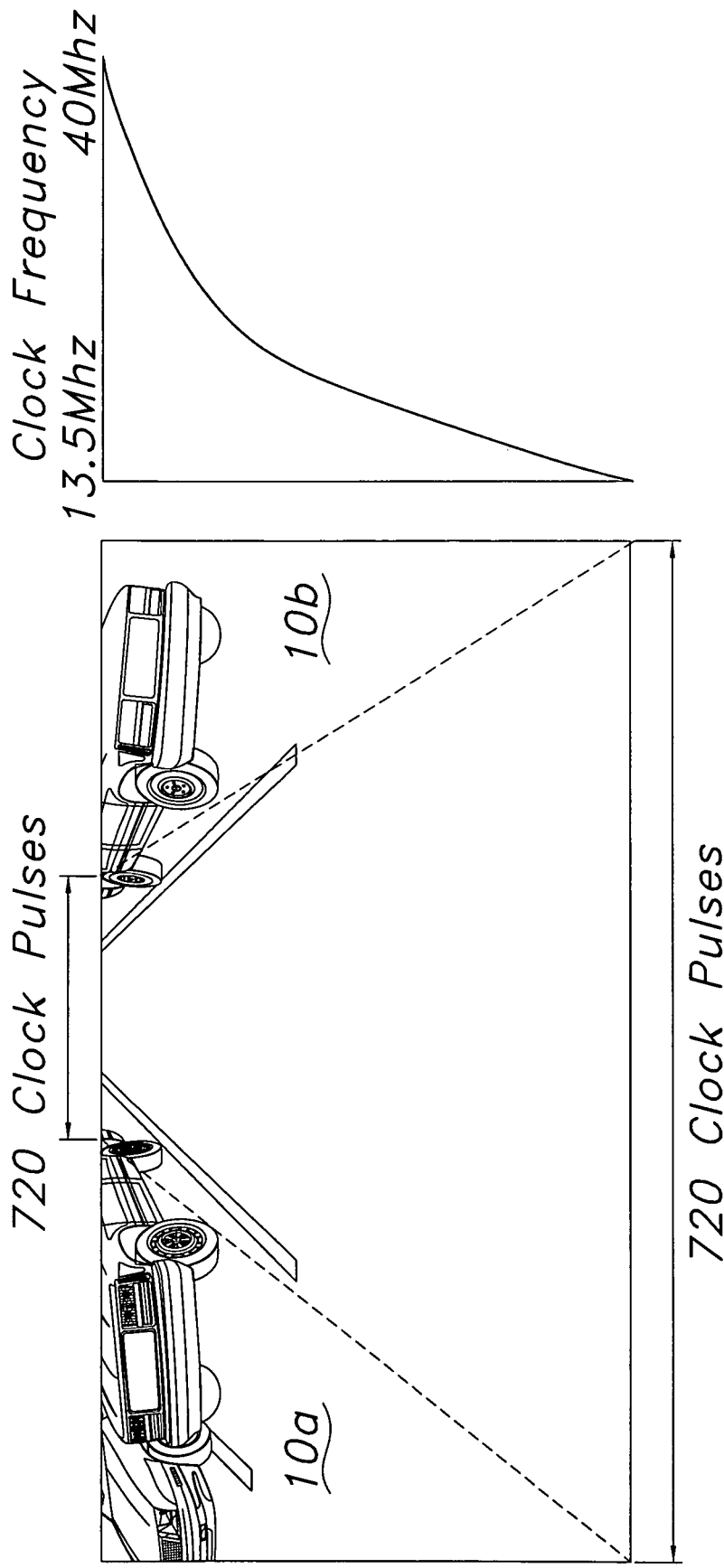
FIG. 2a is a diagram illustrating the portions of the top line and bottom line of the image of FIG. 1 that are displayed on a video screen according to one embodiment of a method of the present invention.
FIG. 2b is a plot illustrating the video clock frequency as a function of the horizontal line of the image of FIG. 2a as used in displaying the image on a video screen according to one embodiment of a method of the present invention.

For each subsequent line downward, the clock rate may be decreased such that the desired 720 samples capture increasing proportions of the video line, as illustrated in FIG. 2b. At the bottom of the image, the minimum clock frequency of 13.5 MHz is reached and 720 samples capture the entire line.

The sample clock may be inhibited during the triangular corner portions 10a, 10b of the image that are not within the 720 clock pulses. This inhibition of the sample clock results in these corner portions 10a, 10b being lost and/or discarded.

In one embodiment, the clock functions as both an analog-to-digital conversion clock and as a FIFO input clock. At the top of the image of FIG. 2b, the clock may be inhibited until the appropriate time, e.g., when at a location about one-third of the way through the top line, then 720 samples are captured at a high frequency (approximately 40 MHz) from the center of the image as shown. The conversion clock frequency decreases for each line from top to bottom until, at the bottom line, the frequency is 13.5 MHz.

Another clock, which functions as both a FIFO output clock and a digital-to-analog conversion clock, runs at a constant rate of 13.5 MHz. Because each video line includes 720 clock pulses, the portion of the top line, captured at 40 MHz, is stretched across the entire video screen, as is each successive line, captured at decreasing rates. Thus, the sampled middle portions of each line may be combined to form an image on a rectangular screen.

Figure 3:
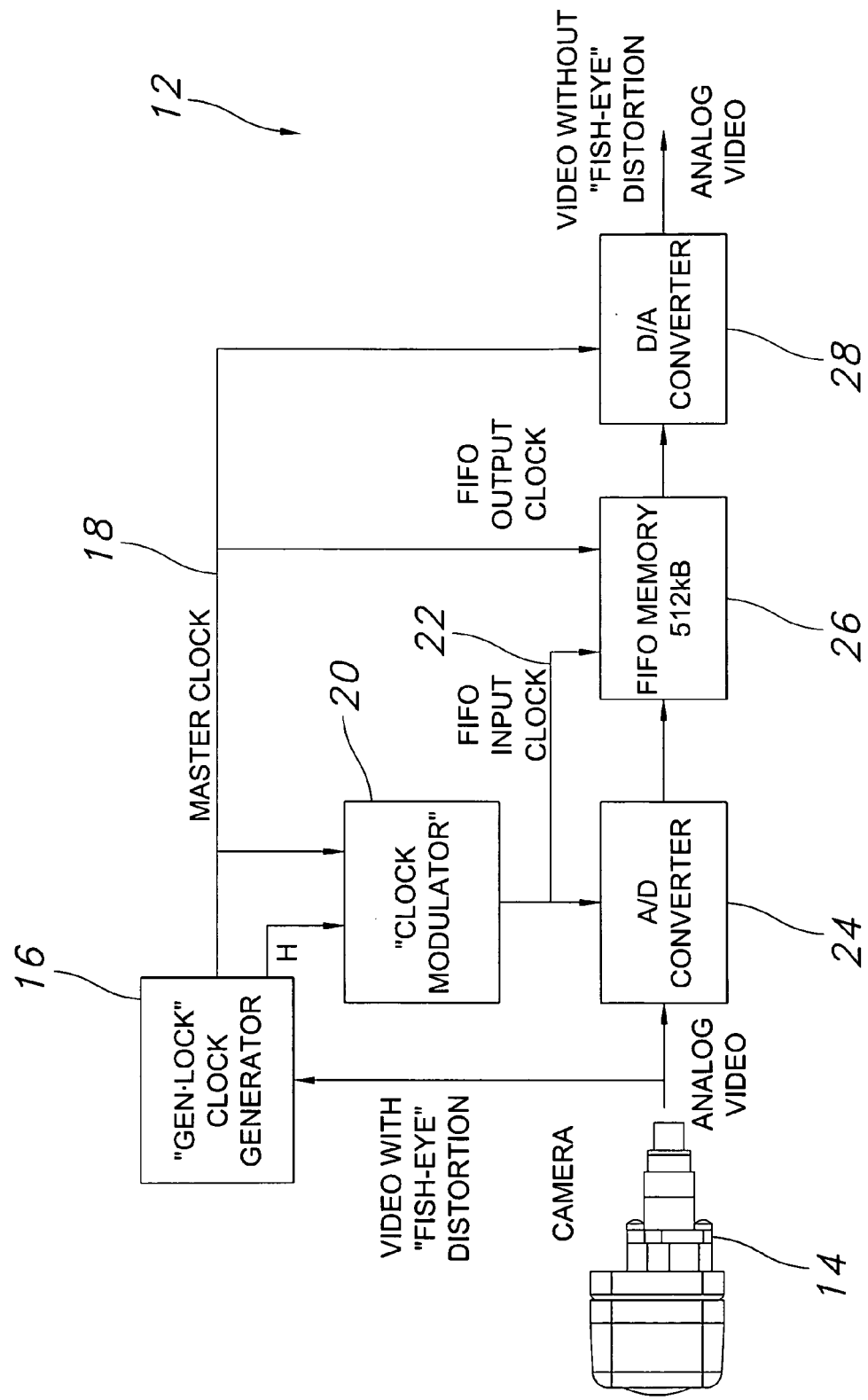
FIG. 3 is a block diagram of one embodiment of a video system of the present invention.

One embodiment of a video system 12 of the present invention is illustrated in FIG. 3. System 12 includes a camera 14 having a fisheye lens. A genlock clock generator 16 uses the video output of camera 14 to produce both a master clock signal 18 and a horizontal synchronization signal H. A clock modulator 20 produces a FIFO input clock signal 22 which is transmitted to both analog-to-digital converter 24 and FIFO memory 26. Master clock signal 18 is fed to FIFO memory 26 as a FIFO output clock signal and to a digital-to-analog converter 28. Although camera 14 outputs video with fisheye distortion, video system 12, and digital-to-analog converter 28 in particular, outputs video without fisheye distortion. It is possible for the entire system 12 with the exception of camera 14 to be included in a single application-specific integrated circuit (ASIC).

Figure 4:
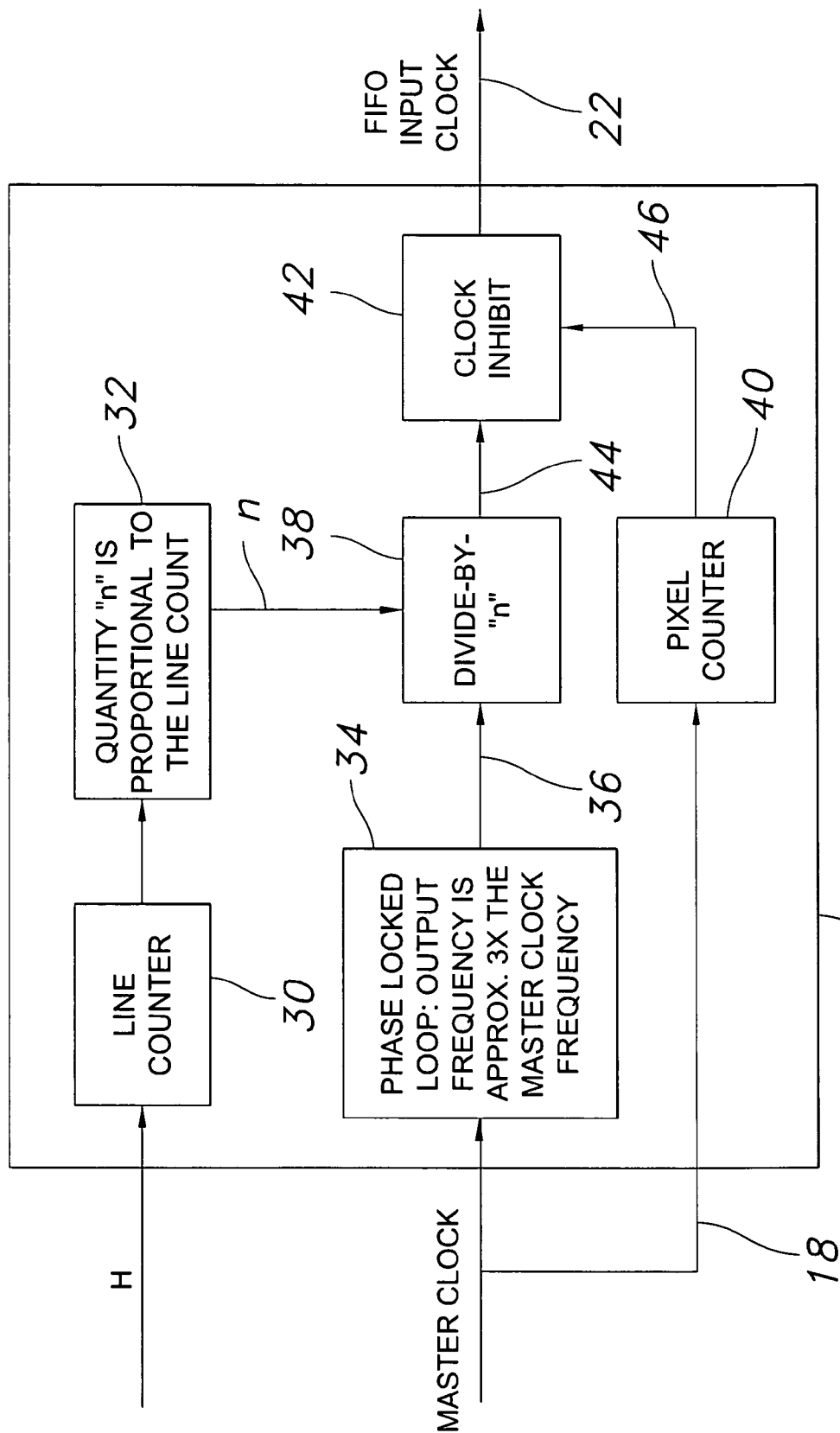
FIG. 4 is a block diagram of one embodiment of the clock modulator of the video system of FIG. 3.

In FIG. 4 is illustrated one specific embodiment of clock modulator 20 for receiving master clock signal 18 and horizontal synchronization signal H and outputting a FIFO input clock signal 22. A digital line counter 30 may count the video lines, e.g., from the top to the bottom of the image, based on the received horizontal synchronization signal H. The maximum clock rate may be divided by a value that is directly proportional to the line count. More particularly, in the embodiment of FIG. 4, a value "n" that is proportional to the line count from counter 30 is produced at 32. Master clock signal 18 is received by a phase locked loop 34. The frequency of an output signal 36 of phase locked loop 34 may be approximately three times greater than the frequency of master clock signal 18. A frequency divider 38 may output a FIFO input clock signal 22 that has a frequency equal to the frequency of output signal 36 divided by the quantity n.

Clock modulator 20 may also include a digital pixel counter 40 that counts the Master Clock cycles on master clock signal 18 and inhibits the start of the sample clock, i.e., the start of FIFO input clock 22, until the appropriate time. In one embodiment, the "appropriate time" is chosen such that the center portion of the image is captured within any given line. For example, at the top of the image, the sample clock is inhibited for approximately one-third of the line such that approximately the center one-third of the top line is captured; at a line midway between the top line and the bottom line, the sample clock is inhibited for approximately one-sixth of the line such that approximately the center two-thirds of the line is captured; and at the last line of the image, the sample clock is not inhibited at all and the entire line is captured.

The above-described inhibition of the sample clock may be performed by a clock inhibit module 42 that receives a raw FIFO input clock signal 44 from frequency divider 38 and an inhibit signal 46 from pixel counter 40. Inhibit signal 46 may be a binary signal with a value of zero when corresponding to the end portions of the image that are to be inhibited, and a value of one when corresponding to the middle portion of the image that is not to be inhibited. Clock inhibit module 42 may logically AND together the raw FIFO input clock signal 44 from frequency divider 38 and the inhibit signal 46 from pixel counter 40 to thereby produce FIFO input clock signal 22.

In one embodiment (not shown), pixel counter 40 receives current line information from the output of line counter 30. Thus, pixel counter 40 may inhibit the FIFO input clock signal 22 for a number of pixels that varies with the line number.

In the embodiment disclosed above, the frequency of the FIFO input clock signal 22 has a specific relationship to the line count produced by counter 30. However, it is to be understood that the present invention more generally encompasses any embodiment in which the frequency of the FIFO input clock signal 22 decreases as the line count produced by counter 30 increases.

Figure 1:
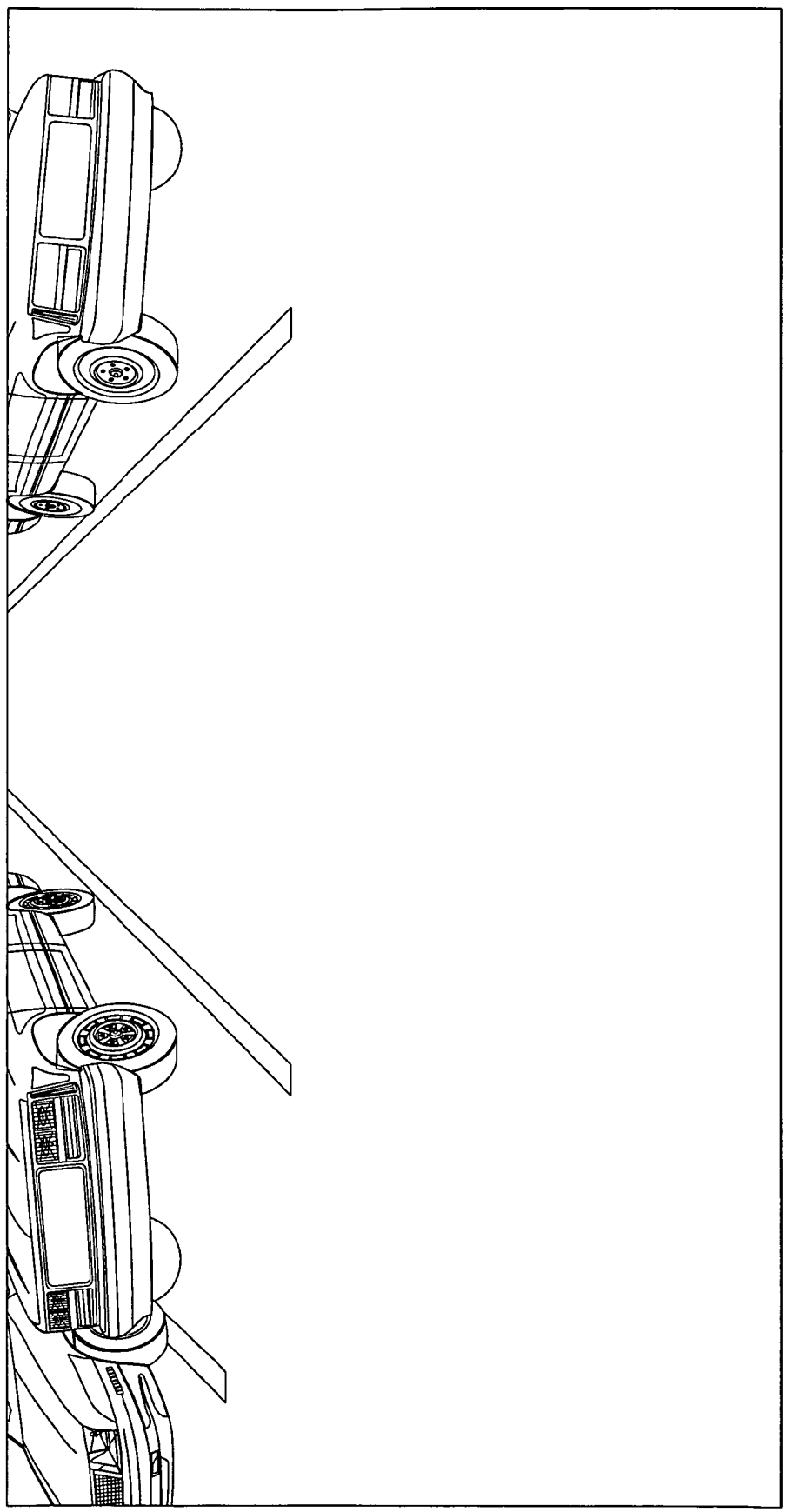
FIG. 1 is an exemplary distorted image captured by a prior art fisheye lens.
Figure 5:
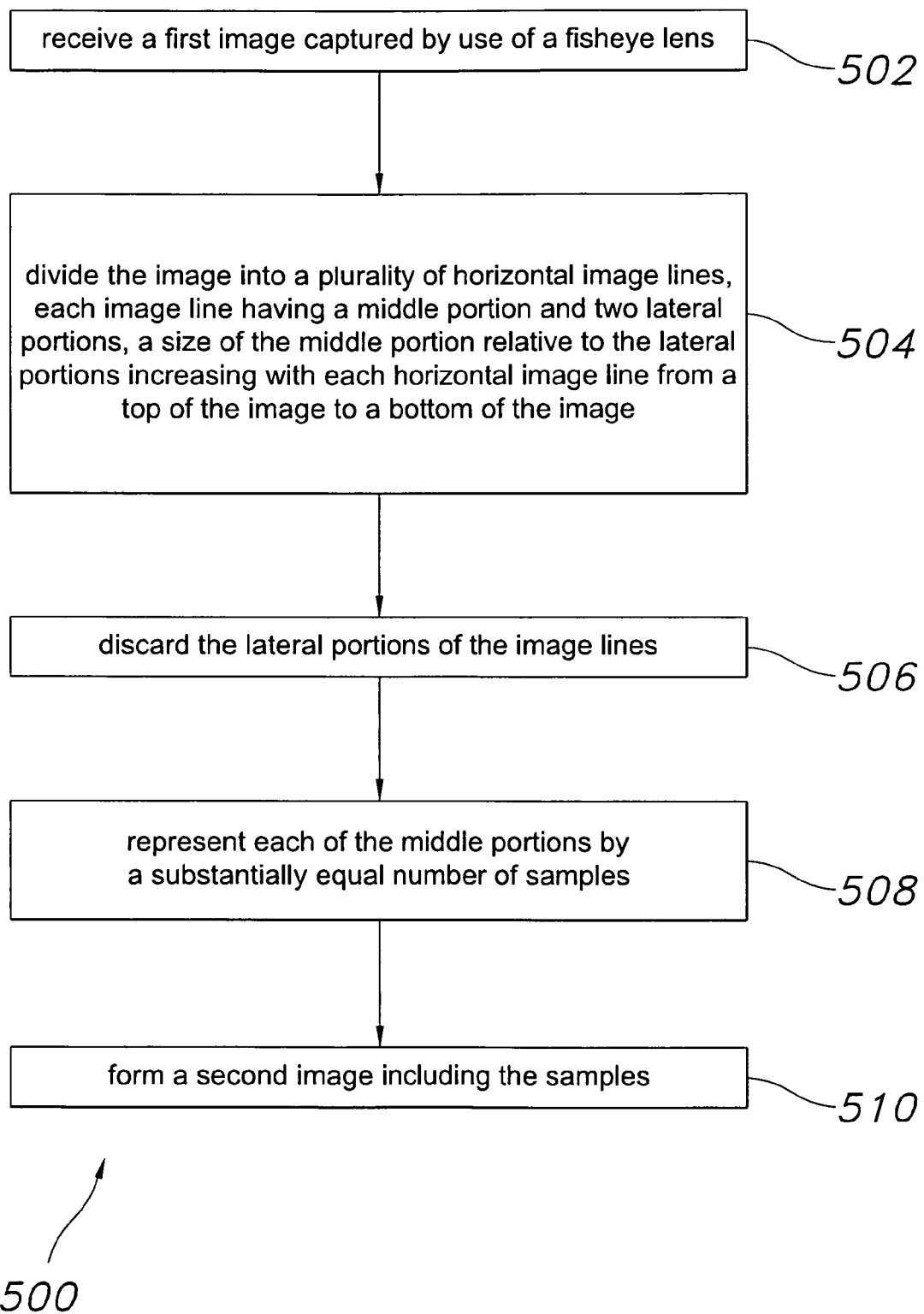
FIG. 5 is a flow chart of one embodiment of a method of the present invention for operating a video system.

One embodiment of a method 500 of the present invention for operating a video system is illustrated in FIG. 5. In a first step 502, a first image captured by use of a fisheye lens is received. For example, camera 14 may include a fisheye lens which may capture the images shown in FIGS. 1 and 2a.

In step 504, the image is divided into a plurality of horizontal image lines, each image line having a middle portion and two lateral portions, a size of the middle portion relative to the lateral portions increasing with each horizontal image line from a top of the image to a bottom of the image. That is, the image shown in FIG. 2a may be formed of, or divided into, a set of parallel, horizontal image lines, with each line extending between the left-hand side and the right-hand side of the image. As shown in FIG. 2a, the image may include two lateral portions 10a and 10b and a trapezoidal middle portion disposed therebetween. As may be seen in FIG. 2a, the middle portion is smallest at the top of the image and gradually grows larger relative to the lateral portions as the bottom of the image is approached.

In a next step 506, the lateral portions of the image lines are discarded. In one embodiment, clock inhibit module 42 prevents the sampling of lateral portions 10a and 10b and allows only the middle portion of the image to be sampled. Thus, the lateral portions of the image lines are never digitized, stored in memory, or otherwise processed, and thus are effectively lost or discarded.

Next, in step 508, each of the middle portions is represented by a substantially equal number of samples. For example, as described in the embodiments above, 720 samples are taken from the middle portion of each of the horizontal lines of the image, regardless of the length of the middle portion. These 720 samples effectively represent the respective middle portion from which they are taken. In order to compensate for the different lengths of the middle portions, the sampling frequency may vary so as to maintain 720 clock pulses, i.e., 720 samples, across the length of the middle portion. The size of the middle portions, i.e., the sampled fractions, may depend upon the distortion characteristics of the lens. Thus, the sampling frequency may also vary with the distortion characteristics of the lens.

In a final step 510, a second image including the samples is formed. That is, all of the samples taken in step 508 may be put together to form a non-distorted image.

Figure 6:
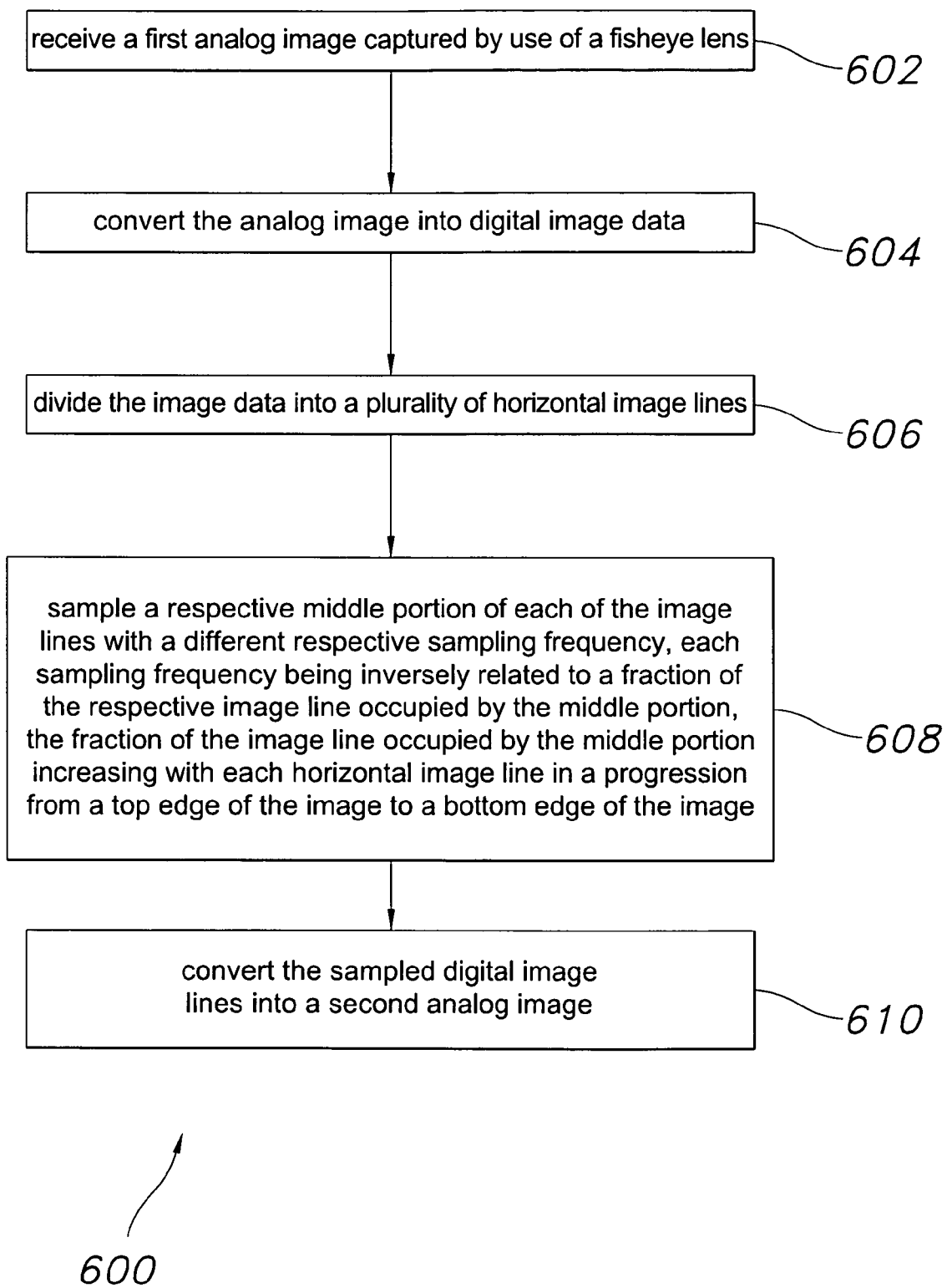
FIG. 6 is a flow chart of another embodiment of a method of the present invention for operating a video system.

Another embodiment of a method 600 of the present invention for operating a video system is illustrated in FIG. 6. In a first step 602, a first analog image captured by use of a fisheye lens is received. For example, camera 14 may include a fisheye lens which may capture the analog images shown in FIGS. 1 and 2a.

In step 604, the analog image is converted into digital image data. In one embodiment, analog-to-digital converter 24 converts the analog image from camera 14 into digital image data stored in FIFO memory 26.

In a next step 606, the image is divided into a plurality of horizontal image lines. That is, the image shown in FIG. 2a may be formed of, or divided into, a set of parallel, horizontal image lines, with each line extending between the left-hand side and the right-hand side of the image.

Next, in step 608, a respective middle portion of each of the image lines is sampled with a different respective sampling frequency, each sampling frequency being inversely related to a fraction of the respective image line occupied by the middle portion, the fraction of the image line occupied by the middle portion increasing with each image line in a progression from a top edge of the image to a bottom edge of the image. For example, in the embodiment discussed above, the middle portions of the image lines between lateral portions 10a, 10b are sampled with varying sampling frequencies ranging from 40 MHz at the top of the image to 13.5 MHz at the bottom of the image. The sampling frequencies are inversely related to the size of the middle portion as a percentage of the entire image line. For example, the middle portion is about one-third of the entire image line at the top of the image where the sampling frequency is 40 MHz. The size of the middle portion gradually increases from one-third of the image line to the entire image line at the bottom of the image, as the sampling frequency gradually decreases from 40 MHz to 13.5 MHz.

In a final step 610, the sampled digital image lines are converted into a second analog image. In the embodiment discussed above, the sampled digital image lines stored in FIFO memory 26 are converted into an analog image by digital-to-analog converter 28.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating a video system, comprising the steps of:
    receiving an image captured by use of a fisheye lens;
    dividing the image into a plurality of horizontal image lines; and
    sampling a respective fraction of each of the horizontal image lines with a different respective sampling frequency, each sampling frequency being inversely related to a size of the sampled fraction, the size of the sampled fraction increasing with each horizontal image line in a progression from a top of the image to a bottom of the image.

2. The method of claim 1 wherein each said fraction comprises a respective middle portion of each said image line.

3. The method of claim 1 wherein the size of the sampled fraction comprises approximately one-third of the image line at the top of the image and comprises the entire image line at the bottom of the image.

4. The method of claim 1 wherein the image comprises an analog image, the method comprising the further steps of:
    converting the analog image into digital image data; and
    converting the sampled digital image lines into a second analog image.

5. The method of claim 1 wherein objects at the top of the image are farther away from the lens than objects at the bottom of the image.

6. The method of claim 1 comprising the further step of discarding portions of each horizontal line that are outside of the sampled fraction.

7. The method of claim 1 comprising the further steps of:
    counting the horizontal image lines;
    counting the number of pixels in each said image line; and
    determining times at which to begin and end the sampling of each line, the determining being based upon each of the counting steps.

8. A method of operating a video system, comprising the steps of:
    receiving an image captured by use of a fisheye lens, the image including a plurality of horizontal image lines; and
    sampling a respective fraction of each of the horizontal image lines with a different respective sampling frequency, each sampling frequency being inversely related to a size of the sampled fraction, the size of the sampled fraction increasing with each horizontal image line in a progression from a top of the image to a bottom of the image.

9. The method of claim 8 wherein each said fraction comprises a respective middle portion of each said image line.

10. The method of claim 8 wherein the size of the sampled fraction comprises approximately one-third of the image line at the top of the image and comprises the entire image line at the bottom of the image.

11. The method of claim 8, wherein the image comprises an analog image, the method comprising the further steps of:
    converting the analog image into digital image data; and
    converting the sampled digital image lines into a second analog image.

12. The method of claim 8 comprising the further step of discarding portions of each horizontal line that are outside of the sampled fraction.

13. The method of claim 8 comprising the further steps of:
    counting the horizontal image lines;
    counting the number of pixels in each said image line; and determining times at which to begin and end the sampling of each line, the determining being based upon each of the counting steps.

14. A video system comprising:
a camera including a fisheye lens;
means for dividing an image captured by the camera into a plurality of horizontal image lines; and
means for sampling a respective fraction of each of the horizontal image lines with a different respective sampling frequency, each sampling frequency being inversely related to a size of the sampled fraction, the size of the sampled fraction being non-decreasing with each horizontal image line in a progression from a top of the image to a bottom of the image.

15. The system of claim 14 wherein each said fraction comprises a respective middle portion of each said image line.

16. The system of claim 14 wherein the size of the sampled fraction comprises approximately one-third of the image line at the top of the image and comprises the entire image line at the bottom of the image.

17. The system of claim 14 wherein the image comprises an analog image, the system further comprising:
means for converting the analog image into digital image data; and
means for converting the sampled digital image lines into a second analog image.

18. The system of claim 14 wherein objects at the top of the image are farther away from the lens than objects at the bottom of the image.

19. The system of claim 14 further comprising means for discarding portions of each horizontal line that are outside of the sampled fraction.

20. The system of claim 14 further comprising:
means for counting the horizontal image lines;
means for counting the number of pixels in each said image line; and
means for determining times at which to begin and end the sampling of each line, the determining being based upon each of the counting steps.

* * * * *